F. A. LAW.
GEARING.
APPLICATION FILED OCT. 25, 1911.

1,098,912.

Patented June 2, 1914.

Witnesses:
N. Muchmore
John Darby

Fred A. Law Inventor
By his Attorney Hermann Kunz

UNITED STATES PATENT OFFICE.

FRED A. LAW, OF ROCHESTER, NEW YORK, ASSIGNOR TO THE COLUMBIA MOTOR CAR COMPANY, A CORPORATION OF CONNECTICUT.

GEARING.

1,098,912. Specification of Letters Patent. Patented June 2, 1914.

Original application filed February 5, 1902, Serial No. 92,677. Renewed July 8, 1907, Serial No. 382,721. Divided and this application filed October 25, 1911. Serial No. 656,707.

*To all whom it may concern:*

Be it known that I, FRED A. LAW, a citizen of the United States, and resident of Rochester, in the county of Monroe, State of New York, have invented certain new and useful Improvements in Gearing, of which the following is a specification, reference being had to the accompanying drawings, forming a part hereof.

This application is a division of renewed application Ser. No. 382,721, filed July 8th, 1907, original Ser. No. 92,677, filed February 5th, 1902, and relates to gearing, particularly such as is used in change speed mechanism or in other cases where complementary gears are slid into and out of mesh.

As shown in the accompanying drawings the gearing is designed particularly for use in the change speed box of self-propelled vehicles, but it is, of course, understood that the particular form shown and described is only one of many methods which may be used in carrying out my invention.

Among the objects of my invention is to produce a form of gearing to facilitate throwing or sliding gears into engagement with a minimum of slip between the rotating parts and minimum liability of fracture, to insure easy and positive engagement of the gears as they are shifted, and other objects which will be apparent from the following.

Figure 1:
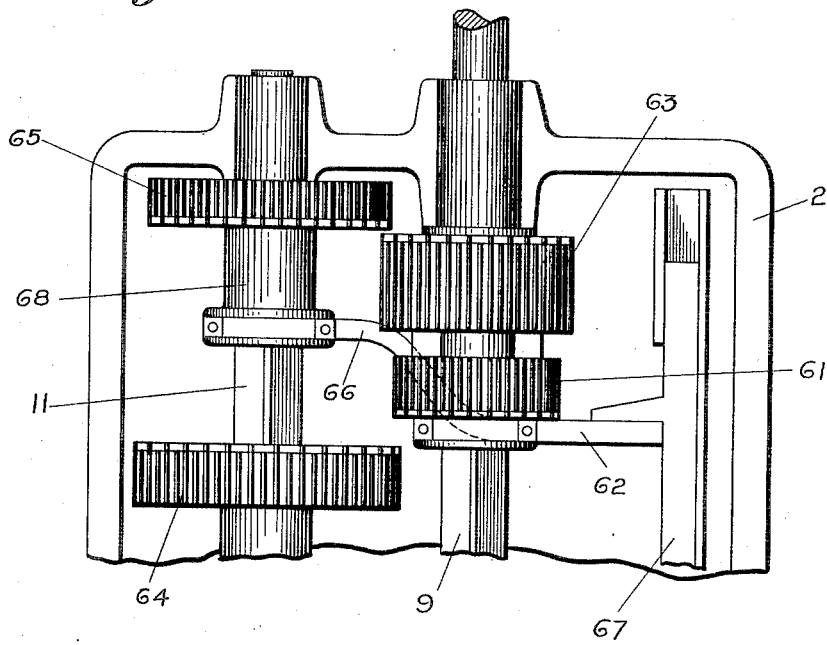
Figure 2:
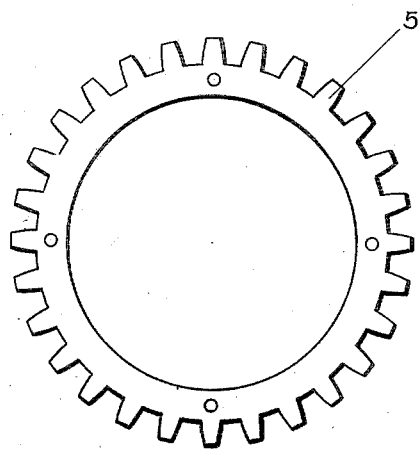
Figure 3:
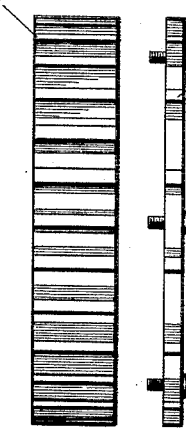
Figure 4:
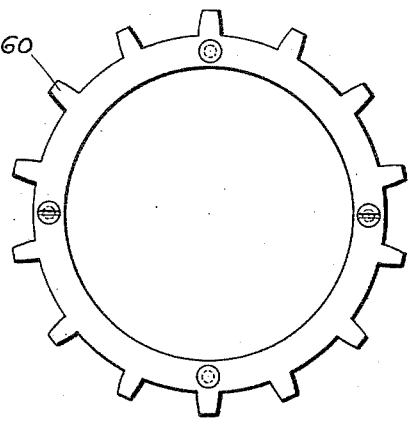

In the drawings Figure 1 in part is a plan view of the interior of a gear box or casing showing two sets of complementary gears. Fig. 2 is a front face view of one of the gears. Fig. 3 is an edge view of the same, showing the relative arrangement of the gear proper and its engagement-plate. Fig. 4 is a front face view of the engagement-plate.

In Fig. 1, 9 is a driving-shaft; 11 is a countershaft; 61 is a gear capable of sliding on the squared portion of the driving-shaft 9; 62 is a shifting-arm attached to shifting-bar 67, reciprocated by any suitable means, not shown; 63 is a fixed gear on the driving-shaft; 64 is a fixed gear on the countershaft; 65 is a gear capable of sliding on the countershaft 11; 66 is an extension-arm attached to arm 62, but reaching to a collar or yoke on sleeve 68, carrying the gear 65.

Part 2 is the lower section of the gear casing supporting the shafts.

59 is a gear and 60 is a disk or shroud for attachment to the side of the gear.

It will be seen that by reciprocating the shifter-bar 67, the arm 62 and its extension 66 are moved, and by other connections, respectively by collars in grooves on the hubs or sleeves of gears 61 and 65, such reciprocation shifts or slides the gears so that gear 65 will be thrown into mesh or engagement with gear 63, and gear 61 will be thrown into mesh with gear 64. The matter of shifting or sliding gears is dealt with generally in the original application, of which this is a division, while this divisional case pertains to the gears or gearing used for that purpose.

In the particular form here shown and described, the main or driving portion of the gear 59 is formed as in the ordinary manner and is shrouded at the side which first engages the mating gear, by a disk 60 having a less number of teeth than the main portion of the gear. As shown in the drawings, this shroud is provided with half the number of teeth employed on the main portion of the gear and when the parts are secured in place, it appears that the alternate teeth of the gear are cut away at one end. The advantages of this construction are apparent as the disk 60 may be made of any desired material and may be hardened to any desired degree, at the same time being made removable and renewable. In sliding gear mechanisms the gear teeth are very often chipped and broken or worn away to a great extent by the slipping action as they come into engagement, and where a full number of teeth is provided, extending across the entire face of the gear, it is more difficult to cause engagement of the sliding gears when they are running at comparatively high speeds.

By providing a shroud, or cutting away the ends of the alternate teeth or the ends of the teeth on one or both of the gears, a greater space is provided which insures quick engagement of the gears as they are slid into mesh, whereupon they may be easily slid into full driving position. Of course, a shroud may be provided at either or both sides of a gear dependent upon its use, shrouds only being used on the opposing sides of the two mating gears. The number of teeth in the shroud is entirely immaterial, and in lieu of a shroud, the ends of the alternate teeth on a gear may be cut away though it is preferred to use a shroud for the purposes of hardening and renewal.

In the practice of my invention it will be seen that the ends of the teeth which are slid toward another gear, are narrow as compared with the space into which they are to slide, and while I have shown one form of embodiment of my invention, it will be seen that if teeth on one gear have their faces cut away at the end of the teeth, that will likewise leave a much smaller end on the teeth as compared with the space, circumferentially, on the other gear into which they are to be slid and engage.

While I have shown my invention as embodied in one form, there are various ways in which it may be used, and I do not wish to limit myself to the particular form shown and described, but What I desire to secure by Letters Patent is:

1. In combination in a change speed gearing, a series of movable gears provided upon their engaging sides with a less number of gear teeth than upon the working faces of the gears.

2. A gear for a change speed mechanism provided with a body portion having gear teeth extending across the entire face of the gear, and having a series of teeth of a less length than the face of the gear.

3. A gear provided with a body portion having teeth extending across its entire face, and a shroud provided with teeth adapted to register with certain of the teeth of the body portion.

4. A gear provided with a body portion having teeth extending across its entire face, and a shroud provided with teeth adapted to register with certain of the teeth of the body portion, and means for firmly uniting said body portion and shroud.

5. In combination with complementary sliding gears, a gear having spaces between the teeth at one end of greater extent, circumferentially, than the opposing ends of the teeth on the interengaging gear.

6. A gear for change speed mechanism having a rim portion with normal teeth cut therein having their ends flush with or within the lateral faces of the gear, said teeth having substantially equal spaces and teeth, and an end portion of the teeth at which the spaces are greater than the normal width of the tooth ends throughout the rest of the teeth.

7. A gear adapted for sliding into lateral engagement with another gear, said gear having teeth and spaces on its face substantially equal circumferentially on the pitch line throughout the major portion of the tooth face, said teeth at one end being cut away within the lateral side of the gear wheel, whereby in the plane of the side the circumferential extent of the spaces is greater than the tooth ends, for the purpose described.

This specification signed at Rochester, State of New York, this 20th day of October, 1911.

FRED A. LAW.

Witnesses:
 JOHN W. OSBORN,
 THERESA L. OSBORN.